United States Patent [19]

Reinauer

[11] Patent Number: 5,150,995
[45] Date of Patent: Sep. 29, 1992

[54] COUPLING FOR A DETACHABLE FIXING OF COMPONENTS AT APPROPRIATE CARRIER MEMBERS

[75] Inventor: Josef Reinauer, Sigmaringen, Fed. Rep. of Germany

[73] Assignee: Gottlieb Guhring KG, Albstadt, Fed. Rep. of Germany

[21] Appl. No.: 573,218

[22] PCT Filed: Feb. 13, 1990

[86] PCT No.: PCT/EP90/00228
§ 371 Date: Sep. 13, 1990
§ 102(e) Date: Sep. 13, 1990

[87] PCT Pub. No.: WO90/09253
PCT Pub. Date: Aug. 23, 1990

[30] Foreign Application Priority Data

Feb. 13, 1989 [DE] Fed. Rep. of Germany ....... 3904259

[51] Int. Cl.$^5$ .............................................. B23B 29/00
[52] U.S. Cl. .................................. 409/234; 403/297; 408/239 R
[58] Field of Search ............... 408/238, 239 R, 239 A, 408/240; 82/159, 160; 279/2 R; 409/232, 234; 403/277, 292, 297

[56] References Cited

U.S. PATENT DOCUMENTS

| | | | |
|---|---|---|---|
| 3,437,362 | 4/1969 | Offenbroich | 403/297 |
| 3,545,625 | 12/1970 | MacMillan | 403/297 |
| 4,045,038 | 8/1977 | Obenshain | . |
| 4,556,337 | 12/1985 | Marshall | 403/297 |
| 4,824,274 | 4/1989 | von Haas | 409/234 |
| 4,844,671 | 7/1989 | Reinauer | 408/239 R |

FOREIGN PATENT DOCUMENTS

| | | |
|---|---|---|
| 548983 | 7/1956 | Belgium .............................. 403/297 |
| 266324 | 5/1988 | European Pat. Off. . |
| 0341227 | 11/1989 | European Pat. Off. . |
| 3602247 | 7/1987 | Fed. Rep. of Germany . |
| 3715659 | 9/1988 | Fed. Rep. of Germany . |
| 3807140 | 12/1988 | Fed. Rep. of Germany . |
| 2528921 | 12/1983 | France .............................. 403/297 |
| 0459852 | 8/1989 | Sweden . |

Primary Examiner—Daniel W. Howell
Attorney, Agent, or Firm—Oblon, Spivak, McClelland, Maier & Neustadt

[57] ABSTRACT

A coupling for a detachable, torsionally and axially rigid fixing of parts, in particular of tool components, at corresponding carrier members, such as a tool base receiver or basic holder. At the carrier member a receiver for a conical or cylindrical centering extension of the part is provided. A chuck member can be actuated by a set screw from the exterior of the part so as to force the two members against each other through a support ring surface pairing. In order to provide an easy handling, a favorable application of force between the parts and compatibility with already existing coupling systems having a centrally disposed drawbar, the chuck member includes three clamp-like chuck claws positioned a circumferential distance with respect to each other which are disposed or arranged each in an axial plane of the coupling. The chuck claws are supported by an anchor portion at a shoulder in the receiver and are movable into an undercut interior recess with a radially outwardly projecting clamping portion. To this effect, the set screw is screwed into one of the chuck claws so that it fits with its radially internal thrust head uniformly against the contacting portions of the two other chuck claws.

15 Claims, 3 Drawing Sheets

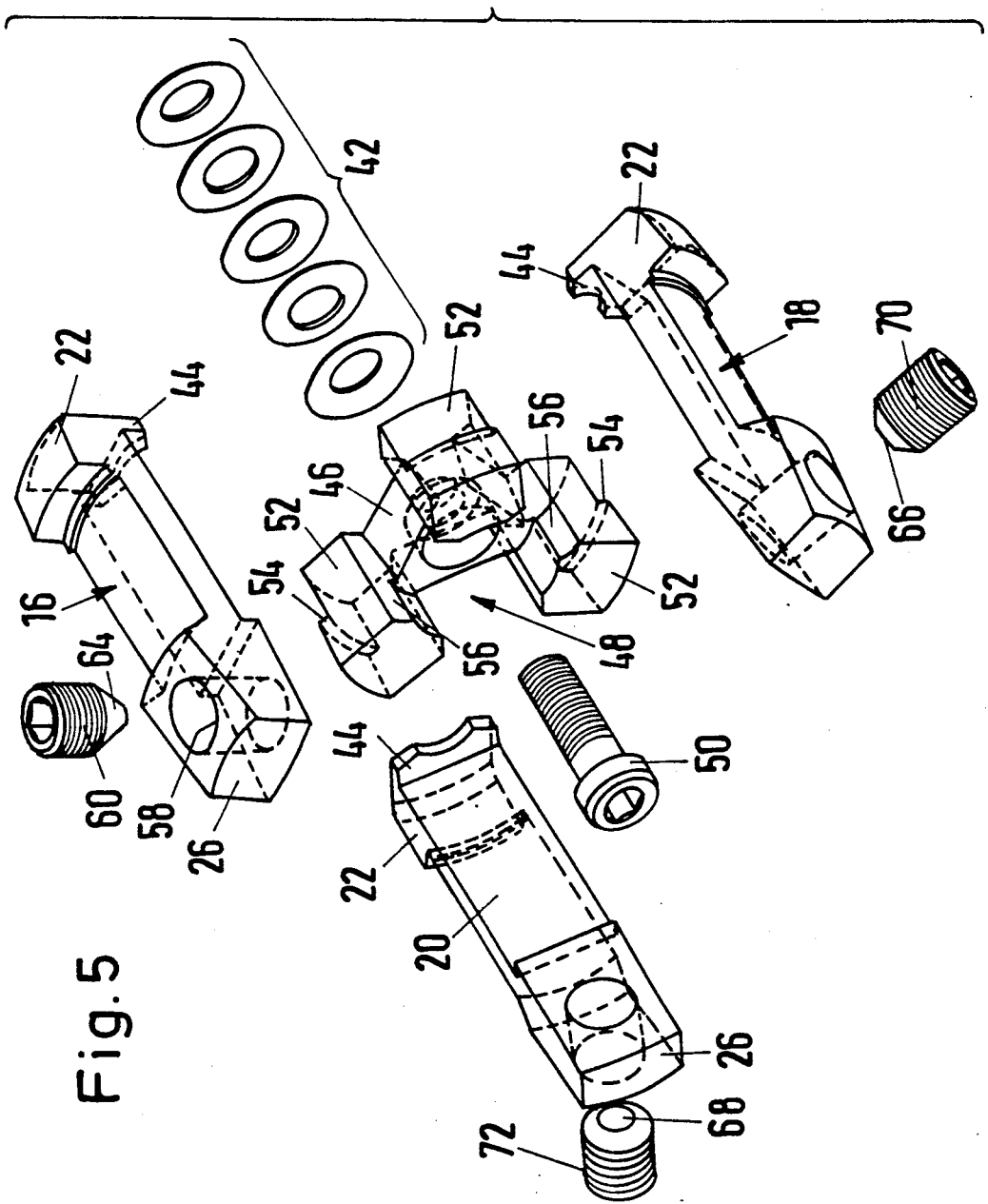

COUPLING FOR A DETACHABLE FIXING OF COMPONENTS AT APPROPRIATE CARRIER MEMBERS

TECHNICAL FIELD

The invention relates to a coupling for a detachable, torsionally and axially rigid fixing of parts, in particular of tool components, at carrier members provided for this purpose, such as a tool carrier or a tool base receiver (basic holder).

BACKGROUND ART

In particular with respect to the fact that modern manufacturing plants are increasingly equipped with automatic tool change systems, there has been a growing need for modular tool systems.

In systems of this kind for instance a precision-manufactured chuck shaft or shank of a tool receiver to which a system of different tools can be coupled is used. Great demands with respect to the flux of force, concentric running and positioning accuracy are made to a coupling system adjusted thereto Already various attempts have been made to provide a universally applicable coupling system which meets the above-mentioned criteria. So, for instance, it has been suggested to employ, in the area of the coupling, a self-centering serration which should bring about the positive connection of the parts in conjunction with a collet chuck. This kind of coupling, however, has been restricted to the interface, i.e. the intermediate portion between tool and the basic holder.

According to another suggested solution the coupling is effected through a centric threaded connection. This coupling impedes the use of automatic tool change systems, since for disconnecting the coupling a frontal access to the parts is necessary so as to quickly release the connection.

A very efficient coupling for the area of the disconnect between the machine tool and the tool system module is described in DE 38 07 140 A1. In this case, clamping or chucking elements are employed in the form of clamping claws extending across the connection portion, i.e. the disconnect, which claws—while being supported in a receiver of the machine spindle—are movable with their radially outwardly projecting claw portions into a recess of a centering extension of the part to be coupled, whereby an axial pressing force is produced. Accordingly, a homogenous distribution of force is provided across the circumference, the constructional space required by the clamping or chucking elements remaining small. However, this kind of coupling requires a drawbar centrically received in the machine spindle which comprises an actuating cone for the chuck claws at its end facing the disconnect. Therefore this coupling is suited as a coupling for components of a modular tool system only conditionally.

Attempts have already been made to employ coupling systems having a central chuck bar and wedge gear also in disconnects between a tool carrier and a stationary tool, for instance a cutter. To this effect, however, a separate and comprehensive transmission has to be provided to actuate the chuck bar extending perpendicularly to the disconnect from outside in axial direction. Apart from the fact that relatively high friction losses result from this transmission, another drawback is to be seen in that a modular series connection of plural tool components is not possible with a unitary actuation of the chuck bar.

From DE 37 15 659 A1 is known chucking means which comprises a drawbar supported to be floating truly axially in the carrier member, the drawbar extending into a coaxial recess of the part to be coupled and forming a cone portion there. The drawbar can be put under tension through this cone portion by an adjusting means supported at the part to be coupled.

This coupling distinguishes by an easy handling, a good power transmission, high concentric running accuracy and high flexibility with respect to the parts to be coupled. However, it is only conditionally compatible with a coupling as described in DE 38 07 140 A1.

DISCLOSURE OF THE INVENTION

Therefore the object underlying the present invention is to provide a coupling such that, by maintaining the above-mentioned advantages, the disconnect can be designed in the area of the part to be coupled in such a way that a direct connection to the coupling system according to DE 38 07 140 A1 can be made.

According to the present invention a coupling is provided which brings about an optimum flux of force between the parts to be coupled. Since the clamping or chuck claws require only relatively little space, the surface contact can be kept very large in the area of the support ring surface pairing. Also difficulties in changing the part due to the temperature are excluded by the basic concept, because the possibly colder part engages with an extension in the receiver of the carrier member. The adjusting means accessible from outside has an extremely simple design and facilitates the use of automatic tool change systems. Accordingly, it is especially advantageous that the cutting forces occurring at the tool have no negative effect on the releasability of the connection. The space remaining between the chuck claws can be used in an advantageous manner for accommodating a rotary locking, i.e. driving means. In the area of the part to be coupled merely a radial opening for the access to the set screw and an undercut interior recess, preferably in the form of a back-off, are necessary. This interior recess may be designed such that the chuck claws of the coupling system employing a central drawbar according to DE 38 07 140 A1 are adapted to engage directly, whereby a uniform coupling concept for any component part systems, in particular tool systems, results.

The present invention also provides for a simple adjustment of the contact portions.

The selection of the contacting surface pairing between the anchor portion and the supporting groove of the present invention provides the possibility of transmitting the axial tensile force possibly without radial stress, even if an eccentricity of the contacting surfaces due to a tolerance is existing between the clamping or chuck claws and the component part.

A particularly compact arrangement results from the present invention as a double function is imparted to the guide body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is an exploded view of the coupling components fixed in the receiver.

BEST MODE FOR CARRYING OUT THE INVENTION

Figure 1:
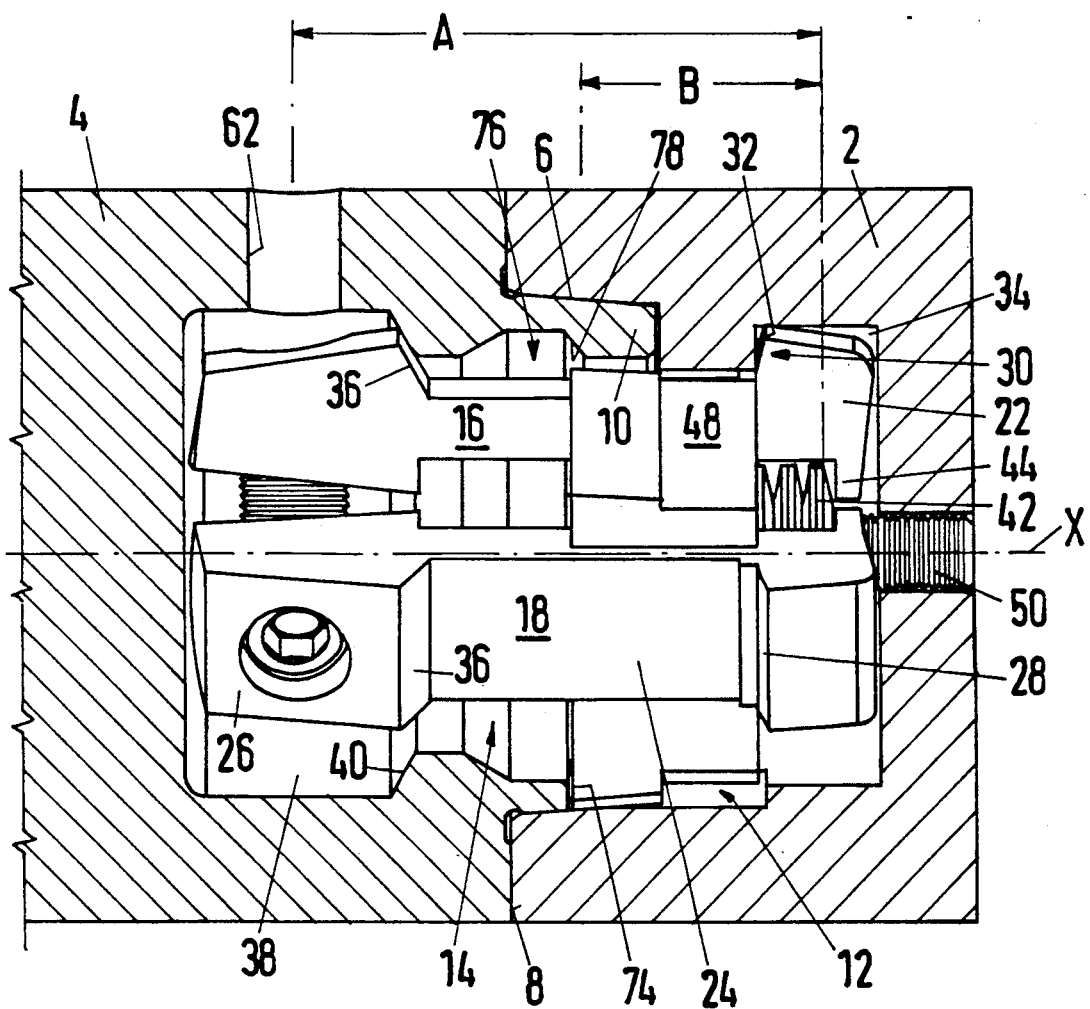
FIG. 1 is a schematic axial sectional view of the coupling.

In FIG. 1 reference numeral 2 denotes a carrier member and reference numeral 4 denotes a part to be coupled thereto. The part may be, for instance, a stationary or a rotary tool, or else a shaft expansion for a modular tool system. The carrier member 2 may be, for instance, a tool base receiver or basic holder, a tool turret or another carrier member of a tool system or a tool handling system. The carrier member 2 may finally also be a component part of other handling means or manipulators.

The two parts 2 and 4 are coupled through a disconnect fit in the form of a centering cone 6 and a support ring surface pairing 8. To this end, the part 4 has a centering extension 10 which engages in a corresponding receiver 12 of the carrier member 2. Also at one side of the part 4 an interior recess 14 is provided which is described in more detail in the following.

Across the disconnection between the two parts there extends three chuck claws 16, 18 and 20 angularly displaced by 120 degrees from one another which are and each arranged in an axial plane and are movable in this plane. Each chuck claw has mainly three portions: an anchor portion 22, a center portion 24 and a claw portion 26. The anchor portion 22 is supported with a rounded or crowned contacting surface 28 at a flank 32 of a shoulder 30 of the receiver 12. The space 34 adjacent to the shoulder 30 is dimensioned to be large enough that the respective chuck claw can sufficiently swivel and/or move in radial direction.

The claw portion 26 is thickened as compared to the center portion 24 and projects, with a wedge face 36, radially outwardly from the center portion 24. With this wedge face the claw portion 26 is adapted to be swivelled or hilted, moved into an undercut interior recess 38, until the wedge face fits closely and with an increasing contacting force against a transition face 40. The normal forces occurring between the contacting surfaces have a substantial component in an axial direction, whereby the chuck claws are put under tension and the two parts 2 and 4 are forced against each other. In the area of the anchor portion preferably a line contact to the flank 32 is provided so that the bending stress of the chuck claws is as low as possible.

The chuck claws are permanently biased so that the chuck portions 26 are pressed inwardly in a radial direction. To this effect, an axially acting spring means is provided in the form of a disk spring assembly 42 which is supported at radially inwardly projecting end portions 44, on the one hand, and at a member fixed at the receiver on the other hand. This member fixed at the receiver is formed in the shown embodiment by a thrust plate 46 of a guide member 48—FIG. 5—which is fixed at the carrier member 2 by means of a central screw 50. The guide member 48 has three guide bodies 52 which are received in an axial fit groove of the receiver 12 and are held axially in position by a radial shoulder 54. Numeral 56 denotes guide sliding faces for the respective chuck claws.

Figure 2:
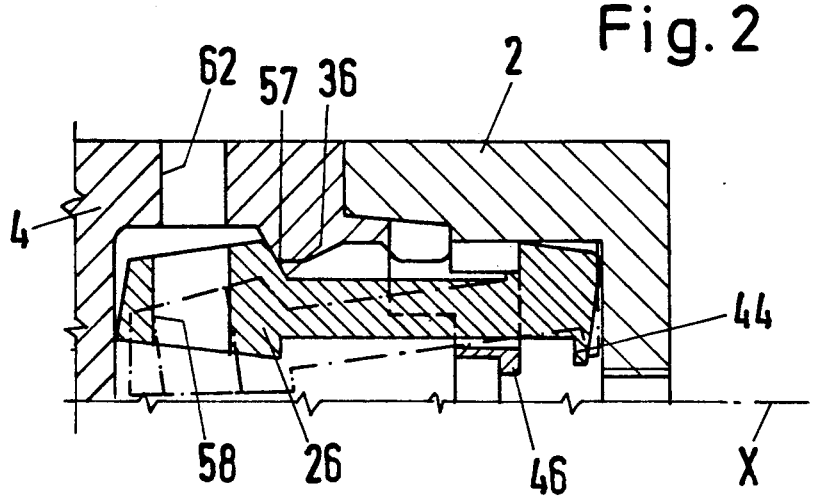
FIG. 2 shows a detail of the coupling to illustrate the motions of the clamping or chuck claws.
Figure 3:
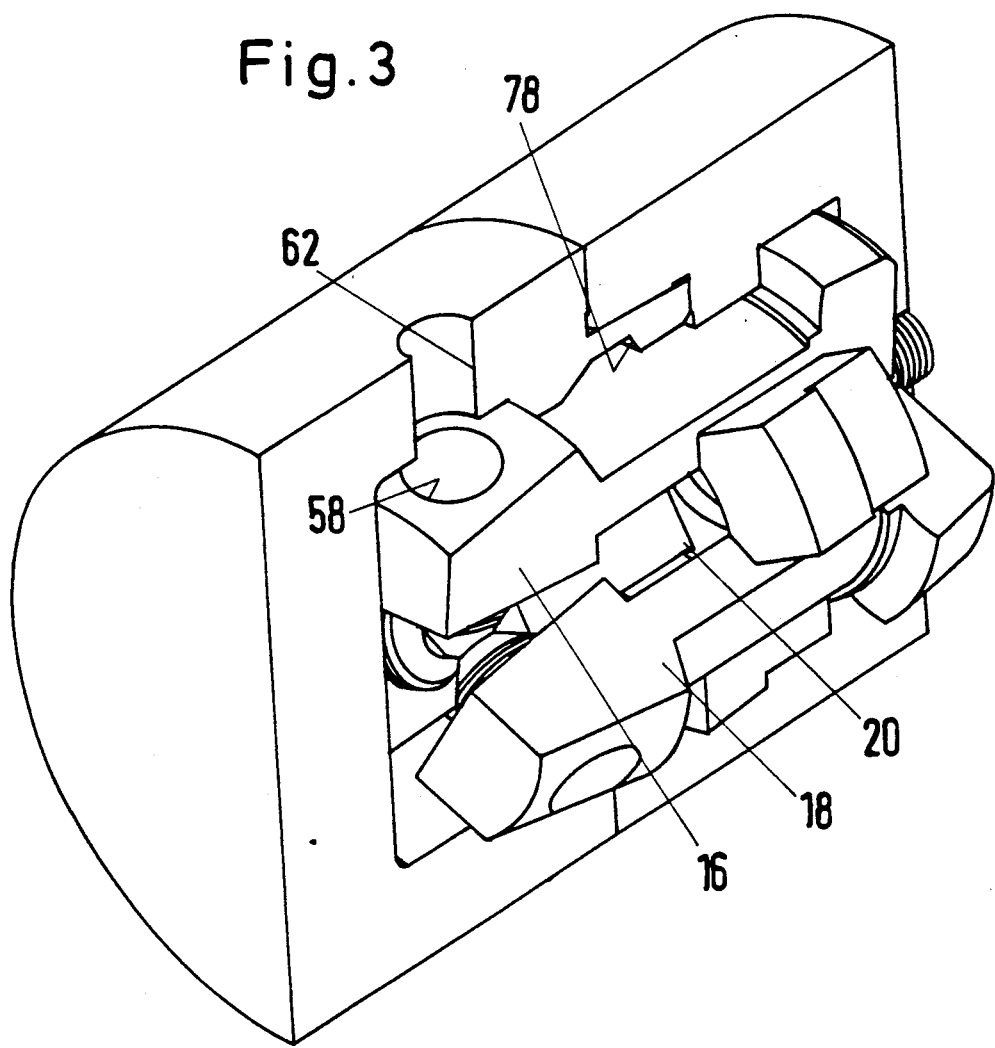
FIG. 3 is a perspective view of the coupling according to FIG. 1.

From the drawing according to FIG. 2 it is apparent that the radially internal surfaces of the claw portions 26 are designed such that the chuck claws are adapted to swivel sufficiently to the inside under the action of the spring assembly to displace the wedge face 36 to a position which is located radially inside the edge point 57 of the transition surface. In this position of the chuck claws the coupling is disconnected.

In order to force the parts to be coupled against each other the following measures are taken: One of the chuck claws—chuck claw 16 in the embodiment—has a substantially radially extending threaded through-hole 58 which receives a set screw 60. If the two parts are joined in the appropriate rotary position, a radial opening 62 through which a tool for actuating the set screw can be introduced is in alignment with the threaded hole 58.

Figure 4:
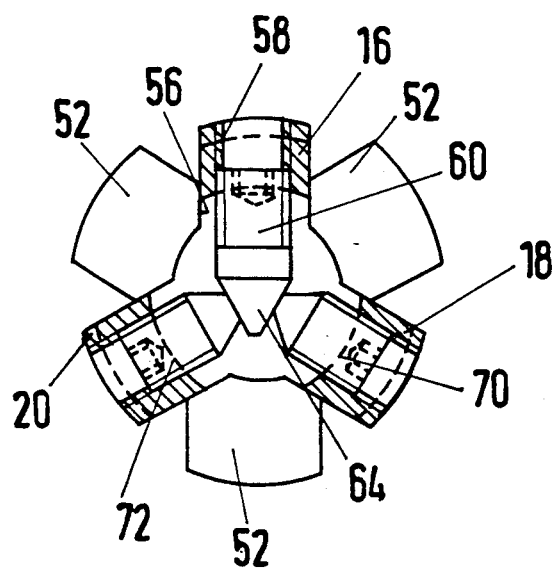
FIG. 4 is a schematic front view of the coupling.

The set screw 60 exhibits at its radially inner end a tapered face 64 interacting with truncated cone faces 66 and 68 of headless screws 70 and 72, which is shown in detail in FIG. 4 where the chuck claws are moved and swivelled to the outside. If the set screw 60 is turned in, all chuck claws are swivelled uniformly to the outside against the force of the disk spring assembly 42 and are pressed against the transition surfaces with the wedge faces 36. For disconnecting the coupling the set screw 60 is turned out, whereby the claw portions 26 approach each other under the action of the resetting force of the spring means 42. The chuck claws are guided along the guide surfaces 56 so that the coupling elements are prevented from jamming.

As the contacting portions interacting with the set screw 60 are formed by adjustable screws in the area of the two other chuck claws, the truncated cone faces 66 and 68 are adapted to be finely adjusted.

The guide bodies 52 fulfill an additional function in an advantageous manner. They act as a drive engaging means as well as a rotary positioning means by fittingly engaging in front-end recesses 74—FIG. 1—of the centering extension 10 with their end portions facing the disconnect. The coupling is consequently also suited for parts which have to keep a defined rotary positioning with respect to the carrier member.

The contacting surfaces between the screws 60, 70 and 72 are preferably hardened to increase their life span. Number 76 denotes another recess in the form of an annular groove in the area of the centering extension 10 which likewise exhibits a conical transition face 78 located radially inside the cylindrical or conical centering extension 10. The inclination of the transition face 78 is adapted to a wedge face of a claw portion not shown in more detail to which a chuck claw is associated; the latter is formed in the receiver-side area in the same way as the above-described chuck claw, it is elongated, however, in axial direction beyond the claw portion so as to form the threaded hole 58 for the set screw 60 in the area of the interior recess 38 and the contacting portions in the radially internal area.

It is obvious that by this variant it is possible to increase the contacting forces acting between the claw portion and the transition face 78 and thus also the pressing forces of the two parts substantially in accordance with the lever arm ratio A:B—see FIG. 1. The arrangement of the transition face 78 radially inside the centering extension 10 moreover entails the advantage that by the action of the chuck claws tensed to the outside at the same time the centering portion is radially expanded, and thus cone deviations due to a tolerance are being compensated. In this way it is possible to select the surface pairing in the area of the centering cone such that, when applying the part 4 to the carrier member 2 without force, initially a support is only given in the larger diameter area of the centering extension. Due to the radially outwardly directed force components exerted by the chuck claws, then the entire cone surface of the centering extension 10 fits against the interior recess in the carrier member 2, when the chuck means is tightened. A similar effect occurs if, instead of a centering cone, a centering cylinder is provided which can then be forced, while being expanded, radially from the inside against the cylindrical interior recess in the carrier member 2 via the chuck claws.

The embodiment illustrated in FIGS. 1 to 5 in which the aforementioned power transmission ratio has the value 1 shows the advantage, however, that the adjusting means is integrated in the claw portion so that a simpler design of the chuck claws and an axially reduced construction result.

Deviations from the embodiment shown are possible, of course, without dropping the basic idea of the invention. So it is not absolutely necessary, for instance, that the set screw 60 extends exactly radially to the inside. By way of an adequate inclination of the axis of the set screw in an axial plane with respect to the central axis X of the coupling the power conversion between the set screw and the contacting portions can be additionally influenced.

Instead of the disk spring assembly 42, also any other axially acting spring means, for example a coil spring, may be employed, of course.

The flank 32 need not necessarily be an integral component part of the carrier member 2. It may be advantageous to make use of wear rings in this area which are adapted to the material of the anchor portion 22 and are designed to be exchangeable as wearing parts, respectively.

Finally also the contacting portions of the chuck claws subject to interaction with the set screw may be constituted by other components. They may be, for instance, an integral component part of the claw portion itself of the chuck claw.

Even in the area of the centering fit between the part 4 and the carrier member 2 it may be advantageous to apply wear rings. Such wear rings are preferably disposed at the carrier member 2 and form the radial and the cylindrical or conical fit surface, which is described in detail also in DE 38 07 140 A1. The invention therefore provides a coupling for a detachable, torsionally and axially rigid fixing of parts, in particular of tool components, at corresponding carrier members, such as a tool base receiver or basic holder. Accordingly, at the carrier member a receiver for a conical or cylindrical centering extension of the part is provided. A chuck means can be actuated by a set screw from the exterior of the part so as to force the two members against each other through a support ring surface pairing. In order to provide easy handling, a favorable flux of force between the parts and compatibility with already existing coupling systems having a centrally disposed drawbar, the chuck means comprises three clamp-like chuck claws positioned a in circumferential distance with respect to each other which are disposed or arranged, each in an axial plane of the coupling. The chuck claws are supported by an anchor portion at a shoulder in the receiver and are movable into an undercut interior recess with a radially outwardly projecting clamping portion. To this effect, the set screw is screwed into one of the chuck claws so that it fits with its radially internal thrust head uniformly against contacting portions of the two other chuck claws.

I claim:

1. A coupling, which comprises:
a carrier member which includes a receiver having a shoulder and a recess;
a part having a plurality of centering extension means for being coupled to said receiver and an undercut recess;
chucking means including means for adjusting said chucking means which are actuable from the exterior of the part such that the carrier member and the part are forced against each other via a support ring surface pairing, said adjusting means including a set screw located in an axial plane of said centering extension means wherein said chucking means includes at least three circumferentially spaced clamp-like chuck claws which are respectively engaged substantially in a longitudinal axial plane of said centering extension, each of said chuck claws having an anchor portion for engaging said shoulder of said receiver and each having a radially outwardly projecting claw portion movable into said undercut recess of said part by screwing action of said set screw into one of said three claws for forcing a radially internal thrust head thereof against contacting portions of the two other chuck claws.

2. A coupling according to claim 1, wherein said claw portion of said one chuck claw has a threaded through hold and wherein said set screw is received in said threaded through hold of said claw portion.

3. A coupling according to claim 1, wherein contacting portions of said chuck claws comprise head portions of stud screws screwed into said chuck claws.

4. A coupling according to claim 3, wherein said head portions comprise truncated conical surfaces which contact with a conical envelope face of said set screw.

5. A coupling according to claim 1 which comprises a spring means produced in the receiver by which said claw portions are radially inwardly biased.

6. A coupling according to claim 5, wherein said spring means comprises a disk spring assembly supported at said carrier member via a thrust disk on the one hand and at radially inwardly projecting end portions of said anchor portions on the other hand.

7. A coupling according to claim 1 wherein said anchor portions are engaged with said shoulder of said receiver.

8. A coupling according to claim 1, wherein said recess of the part comprises an annularly cut space with a conical transitional face.

9. A coupling according to claim 8, wherein each of said claw portions in a coupling state with the part are in planar contact against said transition face.

10. A coupling according to claim 7, wherein said anchor portions fit in a coupled state of the part with line contact at a flank portion of said support groove.

11. A coupling according to claim 1 which comprises guide bodies disposed between said chuck claws through which said chuck claws are laterally guided.

12. A coupling according to claim 11, wherein said receiver has an axial groove and wherein said guide bodies are positioned in said axial groove of said receiver and are supported in an axial direction of said receiver by a radial shoulder.

13. A coupling according to claim 11, wherein at least one of said guide bodies comprises one of a rotary catching and driving means for the part to be coupled.

14. A coupling according to claim 13, wherein in a face of said centering extension at least one recess is provided for fitting engagement with said guide body.

15. A coupling according to claim 11 which comprises a common carrier plate to which are connected said guide bodies wherein said common carrier plate is anchored by means of a centrically disposed screw in the bottom of said receiver and forms a thrust disk for said spring means.

* * * * *

UNITED STATES PATENT AND TRADEMARK OFFICE
CERTIFICATE OF CORRECTION

PATENT NO. : 5,150,995
DATED : SEPTEMBER 29, 1992
INVENTOR(S) : JOSEF REINAUER

It is certified that error appears in the above-identified patent and that said Letters Patent is hereby corrected as shown below:

In column 1, line 23, after "thereto" insert --.--

In column 3, line 32, after "another" insert --, and--; same line, delete "and";

line 46, change "elled or hilted, moved" to --elled, hilted or moved--.

In column 5, line 3, delete "being";

line 65, delete "in".

In column 6, line 35, change "hold" to --hole--;

line 36, change "hold" to --hole--.

Signed and Sealed this

Ninth Day of November, 1993

Attest:

BRUCE LEHMAN

*Attesting Officer*    *Commissioner of Patents and Trademarks*